June 22, 1965 O. GUARRACINO 3,191,059
SELECTIVE PULSE FEEDING CIRCUIT UTILIZING
A TRANSFORMER GATING CIRCUIT
Filed April 6, 1962
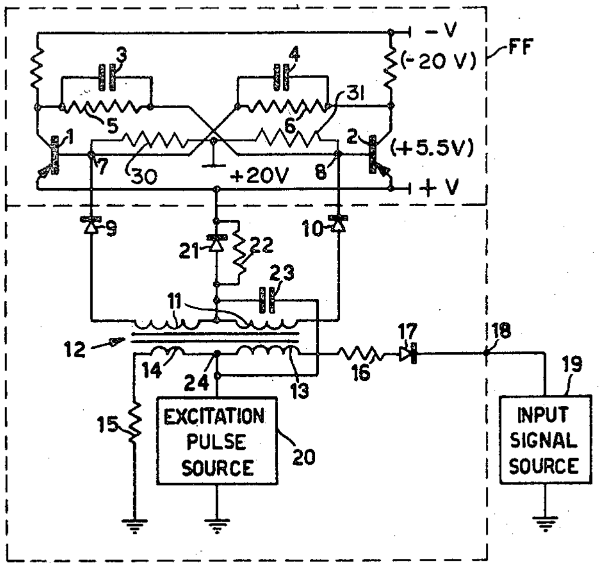
INVENTOR
OTTAVIO GUARRACINO
BY
Kenyon & Kenyon
ATTORNEYS United States Patent Office 3,191,059

Patented June 22, 1965

3,191,059

SELECTIVE PULSE FEEDING CIRCUIT UTILIZING A TRANSFORMER GATING CIRCUIT

Ottavio Guarracino, Milan, Italy, assignor to Ing. C. Olivetti & C., S.p.A., Ivrea, Italy, a corporation of Italy Filed Apr. 6, 1962, Ser. No. 185,552
Claims priority, application Italy, Mar. 26, 1962, 6,226/62
2 Claims. (Cl. 307—88.5)

The present invention relates to a circuit for selectively feeding a pulse to either one of two input terminals of a circuit, for example of a bistable circuit such as a flip-flop.

It is known that a flip-flop may be set either to the state "1" or to the state "0" by feeding a pulse having a predetermined polarity to its input terminal "1," or "0," respectively.

In order to store in a flip-flop a binary information having either the value "1" or "0" without previously cancelling the information stored therein, the information to be stored being represented by a signal having a voltage level "1" or "0," respectively, and being transmitted over a single input terminal, it is necessary to insert between said input terminal and the input terminals of the flip-flop a suitable selective pulse feeding circuit.

In a known pulse feeding circuit, which is disclosed for instance in German patent application No. 1,090,716 published October 13, 1960, each one of the two input terminals of the flip-flop is connected to one terminal of the secondary winding of a transformer. The primary winding of said transformer comprises two sections having different numbers of turns and wound in opposite senses.

An excitation pulse generated by a suitable source causes a current pulse to flow through one or both sections under the control of the binary input signal.

However, said known feeding circuit requires suitable transistor switches connected in series with said two winding sections and a current path, including a diode, connected in parallel with the major section, whereby a great deal of electronic components is required.

The primary object of the invention is to provide a selective pulse feeding circuit having a reduced number of components.

A further object of the invention is to provide a selective pulse feeding circuit of simple structure and reliable operation.

According to the invention, one terminal of both sections of the primary winding is directly connected to the source of excitation pulses, the other terminal of the major section being connected through a diode to the single input terminal for the binary signals.

This and other features of the invention will become apparent from the following description of a preferred embodiment thereof, taken in conjunction with the accompanying drawing, which shows a preferred embodiment of the circuit according to the invention.

The reference letters FF generally designate a flip-flop which comprises two transistors 1 and 2 interconnected in a known manner through two condensers 3 and 4 and two resistances 5 and 6, and is provided with an input terminal "1" and an input terminal "0," designated by the reference numerals 7 and 8, respectively. Said input terminals are connected, through diodes 9 and 10, respectively, to the terminals of the secondary winding 11 of a transformer 12. As is usual in such flip-flop circuits, the bases of the transistors are biased by an appropriate voltage which, in the embodiment illustrated, is shown as +20 v. This bias is applied to the bases of the transistors 1 and 2 through resistors 30 and 31, respectively.

The primary winding of the transformer comprises a major section 13, having for example 2N turns, and a minor section 14, having for example N turns. A terminal of the minor section is grounded through a resistance 15; a terminal of the major section is connected through a resistance 16 and a diode 17 to an input terminal 18 fed by a source of binary signals 19. The other terimal 24 of both sections 13 and 14 is connected to a source of excitation pulses 20, said excitation pulses having an amplitude equal for example to the amplitude of the binary signal "1" emitted by the source 19, a short duration and a predetermined frequency. The two sections 13 and 14 are wound so that a current which flows through them starting from the terminal 24 generates in the transformer magnetomotive forces having opposite senses.

The mode of operation of the pulse feeding circuit will now be briefly described.

If the binary information to be stored is "1," the input terminal 18 has a positive potential, whereby the diode is blocked. Under such conditions, as the generator 20 produces an excitation pulse over the terminal 24, a current flows through the section 14 of the primary winding, but no current flows through the section 13. In this case, a pulse is induced in the secondary winding 11, said pulse having a polarity suitable to drive the input terminal 7 of said flip-flop in order to set the flip-flop in its state "1."

On the contrary, when the binary information to be stored is "0," the input terminal 18 has the ground potential and therefore the diode 17 may conduct. Under these conditions, when the generator 20 generates an excitation pulse, a current flows through both sections 13 and 14 of the primary winding.

Provided the resistances 15 and 16 have been suitably calculated, in this case the magnetomotive force generated by the section 13 overcomes that generated by the section 14, thus inducing in the secondary winding 11 a pulse having a polarity opposite to the polarity of the pulse induced in the foregoing case and therefore suitable for driving the input terminal 8 of the flip-flop and setting it in the state "0."

Whenever a pulse of positive polarity is induced in the secondary winding 11, said positive polarity being suitable for driving either the input terminal 7 or 8, a pulse having the opposite polarity is fed to the input terminals 8 and 7, respectively. However, this latter pulse is blocked by the diodes 10 and 9, respectively.

A suitable group including a diode 21, a resistance 22 and a condenser 23 is provided to neutralize the voltage overshoot produced in the secondary winding of the transformer when the excitation pulse generated by the generator 20 ceases. In fact, at the beginning of the excitation pulse the condenser 23 is charged through the diode 21; when said excitation pulse ceases, said condenser, which may not be discharged through the diode 21, produces a negative pulse on the common terminal 24 of the two sections 13 and 14 of the primary winding, said negative pulse being adapted to neutralize said overshoot.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

What I claim is:

1. A circuit for selectively feeding a driving pulse to either one of the two input terminals of a circuit to be driven under the control of binary input signals supplied by an input source, said feeding circuit comprising in combination:

(a) a transformer having a secondary winding whose terminals are connected to said input terminals, respectively, and having a primary winding including a minor section and a major section, said sections being wound to provide opposing magnetomotive forces when current is introduced at the terminal common to said sections to flow through said sections, (b) a source of excitation pulses directly connected to said terminal common to said sections, (c) and a diode connecting the other terminal of said major section to said input source.

2. A circuit for selectively feeding a driving pulse to either one of the two input terminals of a flip-flop under the control of input signals having either a first or a second voltage level and supplied by an input source, said feeding circuit comprising in combination:

(a) a transformer having a secondary winding whose terminals are connected to said input terminals, respectively, and having a primary winding including a minor section and a major section, said sections being wound to provide opposing magnetomotive forces when current is introduced at the terminal common to said sections to flow through said sections, (b) a source of excitation pulses connected to said terminal common to said sections, each excitation pulse being adapted to drive said terminal common to said sections from said first voltage level to said second voltage level, (c) a source of constant potential having substantially said first voltage level and connected to the other terminal of said minor section, (d) and a diode connecting the other terminal of said major section to said input source to pass current when said input signals have said first voltage level.

No references cited.

JOHN W. HUCKERT, *Primary Examiner.*

DAVID J. GALVIN, *Examiner.*